US00RE46619E

(19) United States
(12) Reissued Patent
Chilton

(10) Patent Number: US RE46,619 E
(45) Date of Reissued Patent: Dec. 5, 2017

(54) FALL ARREST SYSTEM AND METHOD FOR USING SAME

(71) Applicant: National Trench Safety, LLC, Houston, TX (US)

(72) Inventor: Ronald W. Chilton, Montgomery, TX (US)

(73) Assignee: National Trench Safety, Houston, TX (US)

(21) Appl. No.: 15/229,979

(22) Filed: Aug. 5, 2016

Related U.S. Patent Documents

Reissue of:
(64) Patent No.: 8,684,136
Issued: Apr. 1, 2014
Appl. No.: 13/012,926
Filed: Jan. 25, 2011

(51) Int. Cl.
*B66C 23/26* (2006.01)
*A62B 1/06* (2006.01)
*E04G 21/32* (2006.01)

(52) U.S. Cl.
CPC ..... *A62B 1/06* (2013.01); *B66C 23/26* (2013.01); *E04G 21/3276* (2013.01); *Y10T 29/49826* (2015.01)

(58) Field of Classification Search
CPC ..... B66C 23/00; B66C 23/02; B66C 23/022; B66C 23/027; B66C 23/08; B66C 23/10; B66C 23/12; B66C 23/163; B66C 23/166; B66C 23/20; B66C 23/202; B66C 23/203; B66C 23/205; B66C 23/206; B66C 23/24; B66C 23/26
See application file for complete search history.

(56) References Cited

U.S. PATENT DOCUMENTS

| | | | | | |
|---|---|---|---|---|---|
| 274,527 | A * | 3/1883 | Stelle et al. | A61G 7/1046 | 212/230 |
| 1,010,530 | A * | 12/1911 | Taylor | 212/223 | |
| 1,540,630 | A * | 6/1925 | Jenks et al. | 212/223 | |
| 1,650,656 | A * | 11/1927 | Sasgen | 212/175 | |
| 2,568,959 | A * | 9/1951 | Illies | 212/230 | |
| 2,623,643 | A * | 12/1952 | Seamans | 212/179 | |
| 3,845,869 | A * | 11/1974 | Sowers et al. | B66C 23/208 | 212/180 |
| 3,978,989 | A * | 9/1976 | Avila, Jr. | B66C 23/205 | 212/176 |
| 4,560,074 | A * | 12/1985 | Manning | 212/179 | |
| 5,622,237 | A * | 4/1997 | Moldow | A62B 1/06 | 182/37 |
| 5,934,490 | A * | 8/1999 | Mora | 212/176 | |
| 5,975,499 | A * | 11/1999 | Ostrobrod | 254/332 | |
| 6,135,300 | A * | 10/2000 | Fox | B66C 23/208 | 182/60 |
| 6,170,802 | B1 * | 1/2001 | Stovall | 254/8 B | |
| 6,189,866 | B1 * | 2/2001 | Harkins et al. | 254/332 | |
| 6,321,872 | B1 * | 11/2001 | Parker | 182/3 | |
| 6,401,863 | B1 * | 6/2002 | Kirkland | B66D 3/20 | 182/142 |

(Continued)

*Primary Examiner* — Patricia Engle
(74) *Attorney, Agent, or Firm* — Edmonds & Cmaidalka

(57) ABSTRACT

Embodiments of the disclosure provide a fall arrest system. The fall arrest system may include a post disposed on a clamp. The clamp may be configured to secure to a base structure. The fall arrest system may also include a davit arm disposed on the post via one or more hinges. The post may be configured to support a winch and the davit arm may be configured to support a cable therefrom.

20 Claims, 3 Drawing Sheets

(56) References Cited

U.S. PATENT DOCUMENTS

| | | | | |
|---|---|---|---|---|
| 6,425,727 | B1 * | 7/2002 | Hood | 414/543 |
| 6,467,117 | B1 * | 10/2002 | Lantz et al. | 14/6 |
| 6,830,423 | B1 * | 12/2004 | Williams et al. | 414/462 |
| 6,978,974 | B1 * | 12/2005 | Marasco | 248/124.1 |
| 6,983,856 | B1 * | 1/2006 | Burks | B66C 23/20 212/179 |
| 7,044,313 | B2 * | 5/2006 | Haliburda, III | B66C 23/208 182/60 |
| 7,458,760 | B1 * | 12/2008 | Panzarella et al. | 414/543 |
| 7,537,088 | B2 * | 5/2009 | Spitsbergen | B66C 23/208 187/240 |
| 7,823,347 | B1 | 11/2010 | Blinn | |
| 7,828,116 | B2 | 11/2010 | Vetesnik | |
| 2002/0066710 | A1 * | 6/2002 | Spitsbergen | 212/179 |
| 2005/0236352 | A1 * | 10/2005 | Tien | B66C 23/205 212/179 |
| 2006/0163186 | A1 | 7/2006 | Choate et al. | |
| 2008/0035423 | A1 | 2/2008 | Meillet et al. | |
| 2008/0053946 | A1 | 3/2008 | Choate et al. | |
| 2013/0075353 | A1 * | 3/2013 | Thompson | B66C 23/44 212/180 |
| 2016/0221802 | A1 * | 8/2016 | Almeda | B66C 23/18 |

* cited by examiner

FALL ARREST SYSTEM AND METHOD FOR USING SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

1. Field

Embodiments of the present disclosure generally relate to fall prevention. More particularly, such embodiments relate to fall arrest systems and methods for using same.

2. Description of the Related Art

In the United States, falls make up over one-third of all construction fatalities. Over 250,000 non-fatal injuries from falls occurred in 2007 alone. The Code of Federal Regulations (CFR) specifies that an employer must utilize a fall protection system whenever an employee may fall 1.8 m (6 ft) or more from any surface. Each employee who is constructing a leading edge 1.8 m or more above lower levels or who is on a walking/working surface 1.8 m or more above a lower level where leading edges are under construction must be protected from falling by guardrail systems, safety net systems, or fall arrest systems.

Conventional fall arrest systems are often unwieldy and difficult to install and disassemble. Some conventional fall arrest systems can only be used with specific construction equipment having fixed sizes or connections and may not function well with other fall protection methods. Other fall arrest systems previously used do not comply with heightened federal safety standards.

There is a need, therefore, for a fall arrest system that meets current safety standards, may be used with other fall protection methods, is easily movable, and/or is easily attachable to construction site fixtures or structures.

SUMMARY

Embodiments of the disclosure provide a fall arrest system. The fall arrest system may include a post disposed on a clamp. The clamp may be configured to secure to a base structure. The fall arrest system may also include a davit arm disposed on the post via one or more hinges. The post may be configured to support a winch and the davit arm may be configured to support a cable therefrom.

Embodiments of the disclosure may further provide a fall arrest system generally including a post disposed on a clamp, wherein the clamp is configured to secure the post to a base structure. The fall arrest system may also include a davit arm disposed on the post via one or more hinges, wherein the one or more hinges are disposed on a first end of the davit arm. The fall arrest system may further include a winch disposed on the post having a cable extending therefrom toward a second end of the davit arm.

Embodiments of the disclosure may further provide a method for installing a fall arrest system. The method generally includes disposing a first side plate of a clamp adjacent a first side of a base structure, and disposing a second side plate of the clamp proximate a second side of the base structure, such that the base structure is at least partially interposed between the first side plate and the second side plate. The method may also include securing the clamp to the base structure and connecting a post to a top plate of the clamp, the top plate being secured to the first and second side plates. The method may further include disposing a davit arm on the post via one or more hinges.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
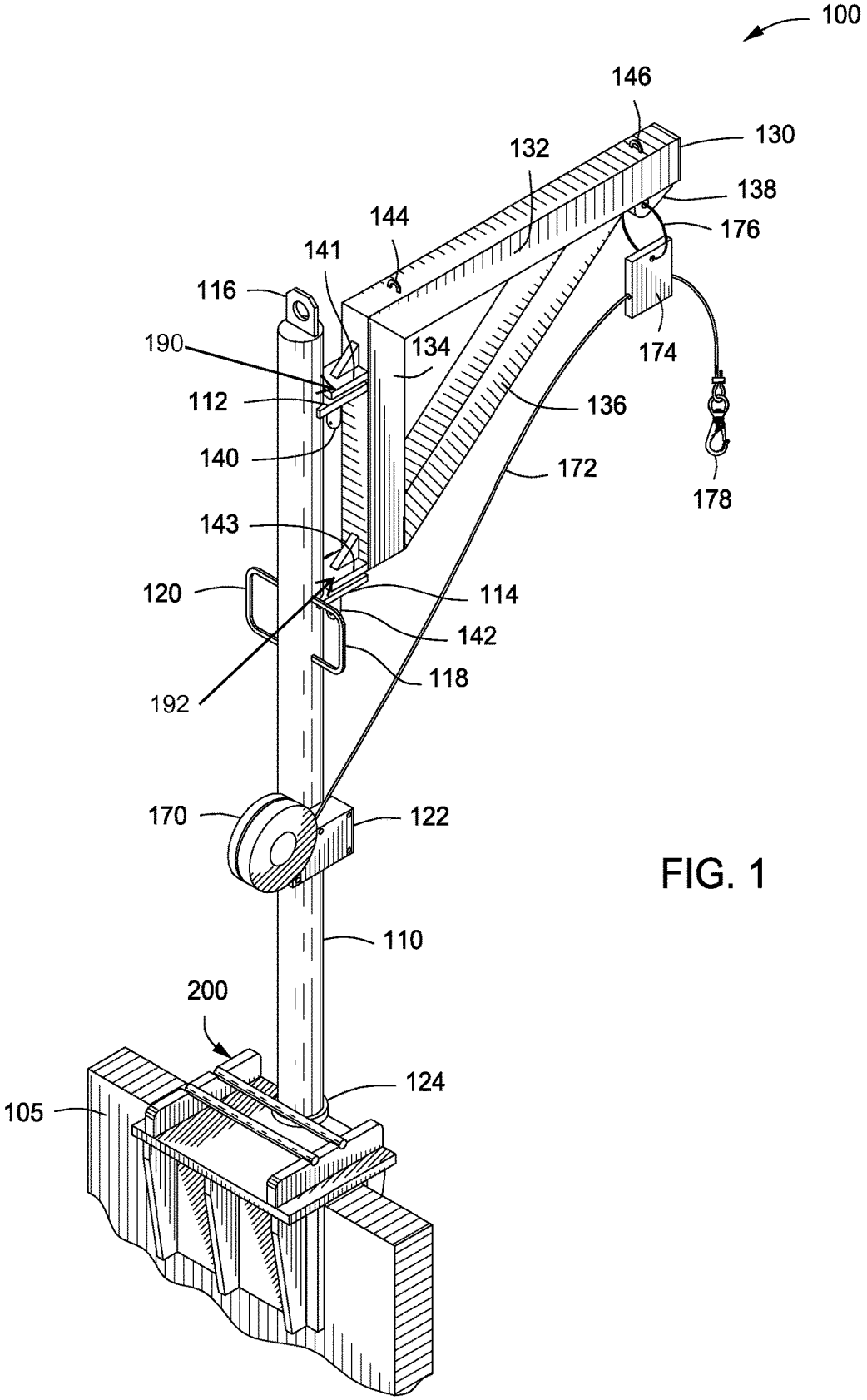
FIG. 1 depicts an isometric view of an illustrative fall arrest system, according to one or more embodiments described.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

The terms "up" and "down"; "upward" and "downward"; "upper" and "lower"; "upwardly" and "downwardly"; "above" and "below"; and other like terms as used herein refer to relative positions to one another and are not intended to denote a particular spatial orientation since the apparatus and methods of using the same may be equally effective at various angles or orientations.

FIG. 1 depicts an isometric view of an illustrative fall arrest system 100, according to one or more embodiments. The fall arrest system 100 meets Occupational Safety and Health Administration (OSHA) regulations by providing anchorage and support to arrest an employee in a fall from a walking/working level (not shown). The fall arrest system may generally be used to prevent the fall of persons from an upper level to a lower level. The fall arrest system 100 may be implemented with a fall protection system (not shown), e.g., guardrail systems, barricades, fences, or the like.

The fall arrest system 100 generally includes a davit arm 130 disposed on a post 110. For example, the davit arm 130 may be hinged to the post 110. The post 110 may have a first or "upper" hinge plate 112 configured to receive a first or "upper" pin 140 of the davit arm 130, and a second or "lower" hinge plate 114 configured to receive a second or "lower" pin 142 of the davit arm 130.

The post 110 may further include a lifting lug 116 disposed at an upper or top end thereof, and one or more lifting handles (two are shown 118, 120) extending from one or more sides of the post. For example, the first lifting handle 118 may be disposed on one side of the post 110, and the second lifting handle 120 may be disposed on an opposite side of the post 110. In at least one embodiment, the lifting handles 118, 120 can be "D" shaped bars each having two ends disposed on the post 110. A chain, cable, hook, or the like may be attached to the lifting lug 116 and/or the lifting handles 118, 120 to transport the post 110 or the entire fall arrest system 100. The lifting handles 118, 120 may also allow for lifting and/or transporting the post 110 by hand.

A winch support 122 may be disposed on the post 110 and may be configured to attach a winch 170 thereto. For example, the winch 170 may be removably secured directly or with a bracket to the winch support 122. The winch support 122 may be disposed on the post 110 at a height that is easily accessible to an employee using or monitoring the fall arrest system 100 from the walking/working level (not shown).

The cross-sectional shape of the post 110 may vary, as desired. Suitable cross-sectional shapes may include, but are not limited to, circular, rectangular, rectangular with rounded corners, triangular, elliptical, diamond-shaped, pentagonal, hexagonal, trapezoidal, or the like. The post 110 may be solid or hollow. For example, the post 110 may be circular, elliptical, or rectangular pipe composed of hollow structural section (HSS), electric resistance welded (ERW) pipe, extruded pipe, or the like. In another example, the post 110 may be a solid piece of iron or steel.

The post 110 is generally configured to be at least partially disposed on, in, or otherwise connected to a clamp 200. In at least one embodiment, the post 110 may be removably coupled to the clamp 200. For example, the post 110 may be disposed in an opening in the clamp 200 and may be secured to the clamp 200 by one or more latches, compression fittings, screws, nuts and bolts, pins, rivets, or the like. Although not shown, the post 110 may be hollow and may be disposed over a connector post of the clamp 200 and removably secured thereto. The post 110 may have a base ring 124 disposed towards a lower end of the post 110 and configured to rest on a connector or top plate of the clamp 200. The base ring 124 may have a larger cross-sectional area than the post 110 to prevent the post 110 from being disposed too far into the clamp 200.

The clamp 200 is generally configured to secure the fall arrest system 100 to a base structure 105 located in a construction site, excavation site, work zone, or the like. Exemplary base structures 105 to which the clamp 200 may be secured include, but are not limited to, excavation support structures, beams, scaffolds, walls, slabs, or the like. Exemplary excavation support structures include, but are not limited to, trench shoring walls, trench shield walls, aluminum trench box walls, shoring panels, slide rail panels, combinations of the same, or the like.

The davit arm 130 generally includes a first beam 132 disposed on a second beam 134. In at least one embodiment, a first or "proximal" end of the first beam 132 may be secured to a first or "upper" end of the second beam 134 to form a corner or elbow therebetween, such that the first and second beams form an upside down "L" shape. For example, the first beam 132 may be oriented in a substantially horizontal direction and the second beam 134 may be oriented in a substantially vertical direction. In at least one embodiment, the first end of the first beam 132 may be welded, pinned, riveted, bolted, or similarly secured to the upper end of the second beam 134. In another embodiment, the first and second beams 132, 134 can be formed of one piece. A cross beam 136 may be disposed between the first beam 132 and the second beam 134 to support and strengthen the davit arm 130. In at least one embodiment, the cross beam 136 may be secured (e.g., welded, pinned, riveted, bolted, or the like) to the first beam 132 and to the second beam 134. In another embodiment, the first and second beams 132, 134 and the cross beam 136 can be formed of one piece. Although not shown, it will be appreciated that more cross beams, bars, plates, or the like, may be added to the davit arm 130 to provide further rigidity and/or support.

A first or "upper" pin support 141 and a second or "lower" pin support 143 are generally disposed on a side of the second beam 134 that faces the post 110. The pin supports 141, 143 may include one or more plates or gussets for supporting the first and second pins 140, 142, respectively. The first and second pin supports 141, 143 may be welded or otherwise secured to the second beam 134 or may be formed as one piece with the second beam 134. The upper and lower, or first and second, pins 140, 142 may be disposed and/or secured to the first and second pin supports 141, 143, respectively. The pins 140, 142 may be welded to the pin supports 141, 143 or formed as part of the second beam 134 and/or the entire davit arm 130.

Figure 3:
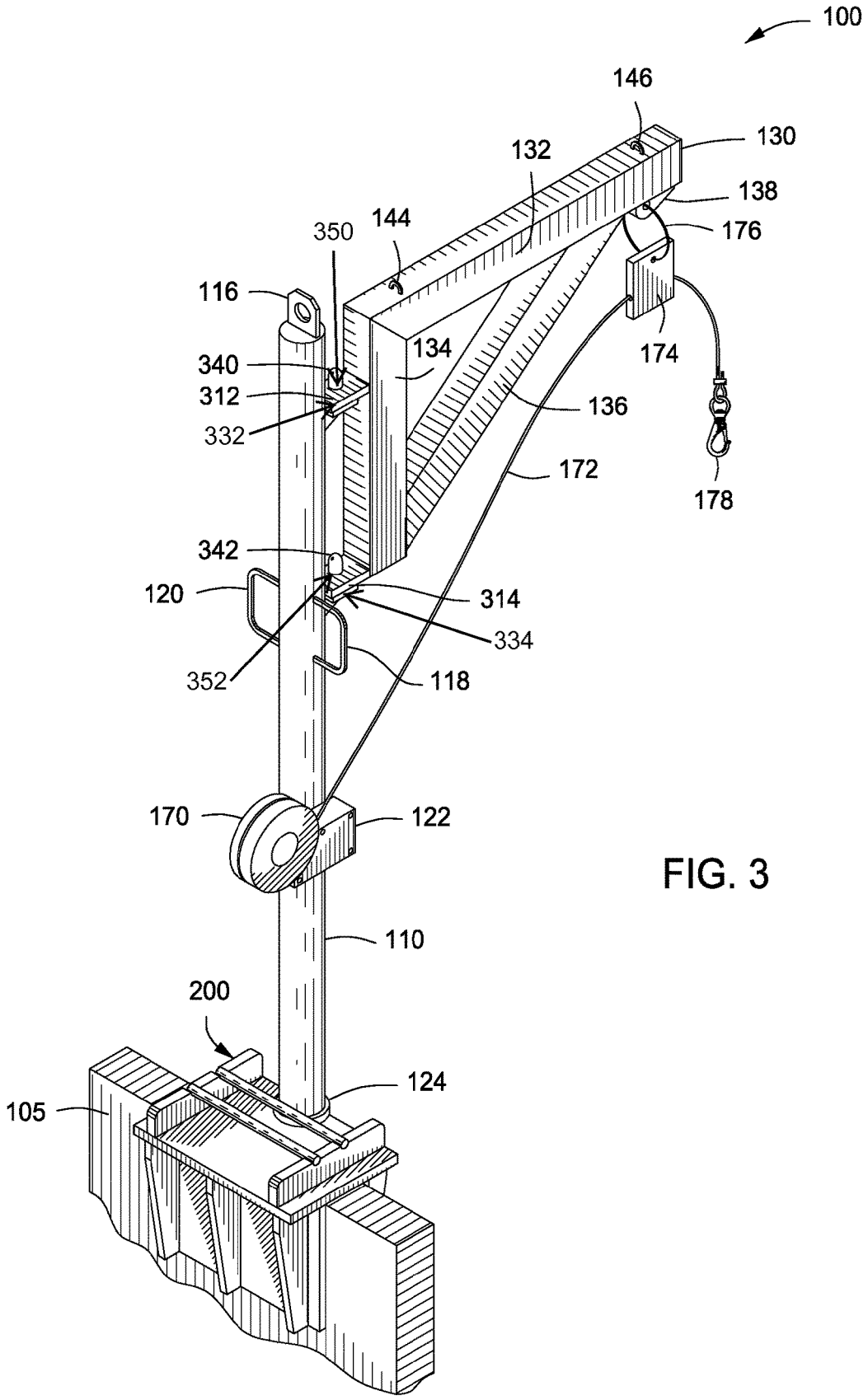
FIG. 3 depicts an isometric view of another illustrative fall arrest system, according to one or more embodiments described.

The pins 140, 142 are generally adapted to be disposed or inserted through holes defined in the hinge plates 112, 114, respectively, to form a pair of hinges 190, 192 between the post 110 and the davit arm 130. As illustrated, the davit arm 130 has pins 140, 142 inserted through holes defined in the hinge plates 112, 114. It will be appreciated, however, that this hinge configuration could be reversed. As shown in FIG. 3, for example, the post 110 may have one or more pins 340, 342 disposed thereon, and the davit arm 130 may have corresponding hinge plate(s) 312, 314 having holes 350, 352 defined therethrough for receiving the one or more pins 340, 342. The hinges 190, 192, 332, 334, allow the davit arm 130 to swivel, pivot, rotate, or otherwise move with respect to the post 110 to provide a wide range of motion and/or reach for the fall arrest system 100. The davit arm 130 may extend away from the structure, e.g., over a ledge or excavation, and may extend over a handrail system, e.g., a guardrail, barricade, fence, or the like. Although not shown, the davit arm 130 can have one or more sleeves configured to be disposed over the post 110 and to swivel, pivot, rotate, or otherwise move thereabout.

A second or "distal" end of the first beam 132 distal the second beam 134 generally extends beyond the point where the cross beam 136 is secured to the first beam 132. A cable support plate 138 may be disposed on this extended portion proximate the second end of the first beam 132 and may be configured to support and/or at least partially anchor cable 172 therefrom or thereto. The term "cable" as used herein may refer to a lanyard, wire, cord, rope, or the like. For example, the cable support plate 138 may be disposed on the bottom of the first beam 132 proximate the second end thereof. One or more holes may be defined through the cable support plate 138 through which a first ring or hook 176 or the cable 172 may be disposed. The cable 172 may extend from the winch 170 through a pulley block 174 to a second hook 178. The pulley block 174 may be secured to the davit arm 130 at the cable support plate 138 via the first hook 176. The first hook 176 and the pulley block 174 may allow the cable 172 and the winch 170 to be easily added to or removed from the davit arm 130. Although not shown, the cable 172 may be disposed through the hole defined in the cable support plate 172 or through the first hook 176. The cable 172 may have a minimum breaking strength of 22.2 kN.

One or more eyelets (two are shown 144, 146) may be disposed on a side of the first beam 132, e.g., the top of the first beam 132. Although not shown, another cable or lifeline may also be disposed through the eyelets 144, 146 and may be joined to a second winch or inertia reel. The fall arrest system 100 may use a plurality of cables and winches that may cooperate to provide further fall protection.

The fall arrest system 100 may be generally capable of supporting about 11.1 kN (2,500 lbs) to about 22.2 kN (5,000 lbs) or more. When stopping a fall of a person secured to the cable 172, the arresting force of the fall arrest system 100 on an employee may be, for example, about 4 kN (900 lbs) when used with a body belt and about 8 kN (1,800 lbs) when used with a body harness. The fall arrest system 100 may have sufficient strength to withstand at least twice the potential impact energy of an employee free falling a distance of about 1.8 m (6 ft) or less.

Any or all of the components of the fall arrest system 100 described above may be composed of a suitable material to meet OSHA standards. Such suitable material may include, but is not limited to, any of one or more metals, fiberglass, wood, composite materials, and plastics, as well as mixtures, blends, and copolymers of any and all of the foregoing materials.

Figure 2:
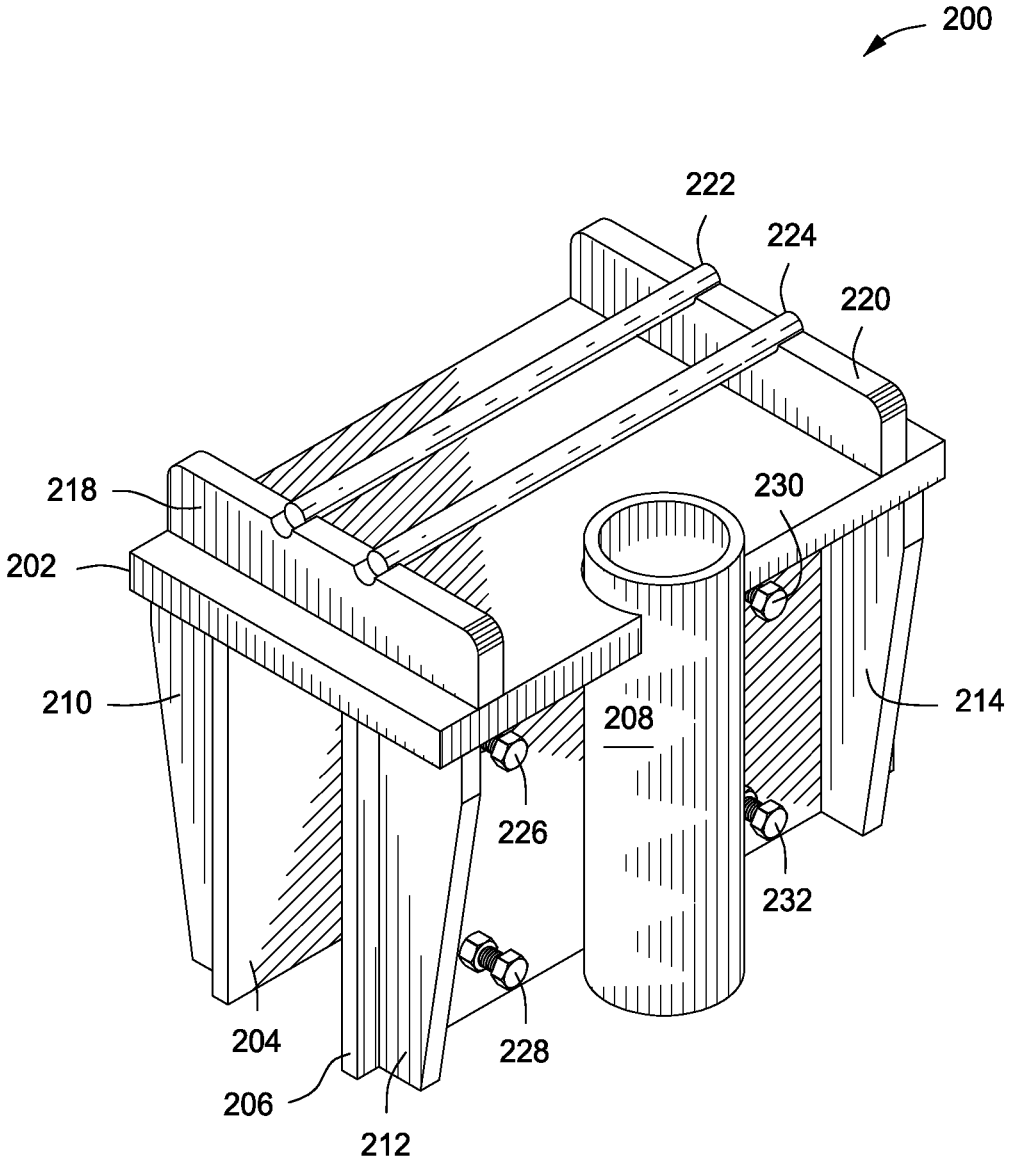
FIG. 2 depicts an isometric view of an illustrative clamp for a fall arrest system, according to one or more embodiments described.

FIG. 2 depicts an isometric view of an illustrative clamp 200 for the fall arrest system 100, according to one or more embodiments. The clamp 200 generally includes a first or "top" plate 202 disposed on or otherwise coupled to a first side plate 204 and a second side plate 206. In at least one embodiment, the top plate 202 may be disposed across edges of the first and second side plates 204, 206, e.g., substantially perpendicular to the first and second side plates 204, 206. For example, the top plate 202 may be substantially horizontal and the first and second side plates 204, 206 may be substantially vertical. The first and second side plates 204, 206 may be spaced apart from one another so that the base structure 105 (see FIG. 1) is interposed between the first and second side plates 204, 206, and the top plate 202 extends over and/or rests on top of the base structure 105. For example, the first side plate 204 may be disposed proximate and/or adjacent a first side of the base structure 105 and the second side plate 206 may disposed proximate and/or adjacent a second side of the base structure 105.

The top plate 202 may extend beyond the first and second side plates 204, 206. One or more stiffeners (three are shown 210, 212, 214) may be disposed and/or secured between the top plate 202 and the first and/or second side plates 204, 206. The stiffeners 210, 212, 214 may be plates or blocks and may add rigidity and strength to the clamp 200. For example, the stiffeners 210, 212, 214 can be dispersed around the clamp 200 and secured between the top plate 202 and the first and/or second side plates 204, 206. Although not shown, in addition to the stiffeners 210, 212, 214, one or more other stiffeners may be added to the clamp 200 to increase the overall strength and/or resiliency of the clamp 200.

A connector 208 may be at least partially disposed on, about, or through the top plate 202. In at least one embodiment, the connector 208 may be circular, elliptical, or rectangular HSS, ERW pipe, or extruded pipe disposed perpendicularly to the top plate 202 and configured to receive the post 110 (see FIG. 1) at least partially therein. For example, the connector 208 may be circular HSS having a first or "top" end disposed through the top plate 202 and a side thereof disposed proximate and/or adjacent the first or second side plates 204, 206. The connector 208 may be welded, bolted, screwed, pinned, riveted, or otherwise secured to the top plate 202 and/or one of the first and second side plates 204, 206.

As illustrated, the connector 208 may be disposed on the top plate 202 off-center, e.g., to one of side of the clamp 200, to transfer the weight and stress of the post 110 onto the first or second side of the base structure 105. It will be appreciated, however, that the connector 208 may be disposed on a top side of the clamp 200, e.g., on top of the top plate 202. For example, the connector 208 may be a solid post (not shown) disposed on the top plate 202 and configured to be disposed within an opening in the post 110. In another example, the connector 208 may be HSS pipe disposed on the top of the top plate 202 where a bottom end of the connector 208 is welded to the top plate 202.

The top plate 202 may further include one or more lifting plates (two are shown 218, 220) disposed on an opposite side of the top plate 202 from the first and second side plates 204, 206. In at least one embodiment, a first lifting plate 218 may be disposed proximate a first end of the top plate 202, and a second lifting plate 220 may disposed proximate a second end of the top plate 202. The lifting plates 218, 220 may be disposed on the top plate 202 transverse to the first and second side plates 204, 206. One or more bars (two are shown 222, 224) may be disposed on and/or between the lifting plates 218, 220. The bars 222, 224 may be disposed transverse the lifting plates 218, 220, for example, and may be welded thereto to provide extra strength and resiliency to the clamp 200. Chains, hooks, chords, or the like may be attached to the bars 218, 220 to at least partially lift the clamp 200 and transport it from place to place, e.g., to and from the base structure 105.

One of the first or second side plates 204, 206 may serve as a backer element for the clamp 200, and the other of the first and second side plates 204, 206 may support one or more biasing devices (four are shown 226, 228, 230, 232).

In at least one embodiment, the biasing devices 226, 228, 230, 232 are generally disposed on or through the first or second side plates 204, 206 of the clamp 200 and are configured to provide biasing engagement with the first or second side of the base structure 105. For example, the biasing devices 226, 228, 230, 232 may be disposed through the second side plate 206 and configured to force one or more biasing ends of the biasing devices 226, 228, 230, 232 against the second side of the base structure 105. As the biasing ends are forced or urged against the second side of the base structure, the first side plate 204 is pulled or otherwise adjusted into biasing engagement with the first side of the base structure 105, thereby securing the clamp 200 thereto. Although not shown as such, the biasing ends of the biasing devices 226, 228, 230, 232 may include substantially flat surfaces, rounded points, or the like, configured to be biased against the base structure 105.

In at least one embodiment, the biasing devices 226, 228, 230, 232 may be screw-like devices threadably engaged with perforations defined in the first or second side plates 204, 206. As such, rotating or screwing the biasing devices 226, 228, 230, 232 in a first direction may serve to advance the biasing ends of the biasing devices 226, 228, 230, 232 toward the first or second side of the base structure 105. Rotating or screwing the biasing devices 226, 228, 230, 232 in a second or opposing direction may serve to release the biasing pressure and loosen the biasing devices 226, 228, 230, 232 from engagement with the base structure 105.

As illustrated, the first and second side plates 204, 206 are stationary. It will be appreciated, however, that the clamp 200 may utilize one or more movable side plates or jaws that can be tightened to or around the base structure 105. For example, the clamp 200 may be a vice-like device having a first jaw positioned on the first side of the base structure 105 and a second jaw configured to provide biasing engagement with a second side of the base structure 105, such that the base structure 105 is secured between the first and second jaws.

With continuing reference to FIGS. 1-2, in operation, the fall arrest system 100 may be transported to a construction site, excavation site, work zone, or the like, and disposed on a structure therein, e.g., the base structure 105. The fall arrest system 100 may be transported as one unit, or one or more components of the fall arrest system 100, e.g., the clamp 200, the post 110, the davit arm 130, and/or the winch 170, may be transported individually. To transport and/or dispose the fall arrest system 100 onto the base structure 105, chains, cables, hooks, or the like may be removably secured to the lifting lug 116 and/or lifting handles 118, 120, to the first or second beams 132, 134 and/or the eyelets 144, 146, and/or the bars 222, 224 of the clamp 200. The fall arrest system 100 may be lifted and moved over the base structure 105 and then lowered thereon. A lifting device, rigging device, or the like may aid transporting, lifting, and lowering the fall arrest system 100. In another example, the fall arrest system 100 may be moved about via one or more persons.

In at least one embodiment, the entire fall arrest system 100 may be lifted, transported, and/or lowered onto the base structure 105 as one piece, i.e., where the davit arm 130 is joined to the post 110 and where the post 110 is already connected to the clamp 200. In another embodiment, the clamp 200 may be lifted, transported, lowered, and/or otherwise disposed onto the base structure 105 first and then secured thereto. Specifically, the first side plate 204 and the second side plate 206 of the clamp 200 may be placed proximate either side of the base structure 105 so that the top plate 200 of the clamp 200 rests thereon.

Once the clamp 200 is disposed at a desired location on the base structure 105, it may be secured thereto using the biasing devices 226, 228, 230, 232. For example, the biasing devices 226, 228, 230, 232 may each be rotated to bias the ends of the biasing devices 226, 228, 230, 232 against the base structure 105, thereby compressing or otherwise clamping the base structure 105 between the ends of the biasing devices 226, 228, 230, 232 and one of the first or second side plates 204, 206 of the clamp 200. Because of the variable length of each of the biasing devices 226, 228, 230, 232, and therefore its ability to clamp at various widths, the clamp 200 may be appropriately adjusted and/or configured to fit on a variety of base structures 105 having various dimensions.

After the clamp 200 is secured, the post 110 may then be connected to the clamp 200 followed by the davit arm 130 to the post 110. The pins 140, 142 of the davit arm 130 can be aligned with holes in the hinge plates 112, 114, respectively, of the post 110 and inserted therethrough. The hinged davit arm 130 can then swivel with respect to the post 110, as desired or required.

Before or after the clamp 200 is secured, the winch 170 may be disposed on and otherwise secured to the winch support 122 of the post 110 and the cable 172 may be fed through the pulley block 174. The pulley block 174 may then be hooked to the cable support plate 138 via the first hook 176, and a second hook 178 may then be attached to the end of the cable 172. Although not shown, the second hook 178 can be attached to a safety belt or safety harness, as desired.

If desired, the fall arrest system 100 may be utilized with other fall protection, e.g., guardrails, barricades, fences, or the like. The distal end of the davit arm 130 can extend over these other forms of fall protection and swivel back and forth to allow the cable 172 to have range over a large area in the construction site, excavation site, work zone, or the like.

Although not shown, two or more fall arrest systems 100 may be disposed along the base structure 105. For example, a plurality of fall arrest systems 100 can be located a predetermined distance from one another to provide a plurality of safety cables to a construction site, work zone, excavation site, or the like. In at least one example, two adjacent fall arrest systems 100 can be located about 1 ft, about 5 ft, about 10 ft, about 20 ft, about 25 ft, about 30 ft, about 35 ft, about 40 ft, about 45 ft, or about 50 ft from one another along the base structure 105. In at least one other example, two adjacent fall arrest systems 100 can be located apart from one another at a distance of less than about 50 ft, less than about 40 ft, less than about 30 ft, less than about 25 ft, less than about 20 ft, or less than about 10 ft.

Embodiments of the present disclosure further relate to any one or more of the following paragraphs:

1. A fall arrest system, comprising: a post disposed on a clamp, the clamp being configured to secure to a base structure; and a davit arm disposed on the post via one or more hinges, the post configured to support a winch and the davit arm configured to support a cable therefrom.

2. The fall arrest system of paragraph 1, wherein the clamp comprises: a top plate coupled to a first side plate and a second side plate, the top plate being configured to extend over the base structure such that at least a portion of the base structure is interposed between the first and second side plates; and a connector at least partially disposed on the top plate.

3. The fall arrest system of paragraph 2, wherein the second side plate comprises a biasing device configured to place the first side plate in biasing engagement with a first side of the base structure, thereby securing the clamp thereto.

4. The fall arrest system of paragraph 3, wherein the biasing device comprises a screw-like device threadably engaged with a perforation defined in the second side plate, wherein an end of the screw-like device is configured to provide biasing engagement with a second side of the base structure.

5. The fall arrest system according to any one of paragraphs 2 to 4, wherein the connector comprises a pipe, and wherein the post is at least partially disposed through an open end of the pipe.

6. The fall arrest system according to any one of paragraphs 1 to 5, further comprising a winch disposed on the post.

7. The fall arrest system according to any one of paragraphs 1 to 6, wherein the one or more hinges each comprise: a hinge plate disposed on the post and having a hole defined therethrough; and a hinge pin disposed on the davit arm and inserted into the hole in the hinge plate.

8. The fall arrest system according to any one of paragraphs 1 to 7, wherein the one or more hinges each comprise: a hinge plate disposed on the davit arm and having a hole defined therethrough; and a hinge pin disposed on the post and inserted into the hole in the hinge plate.

9. The fall arrest system according to any one of paragraphs 1 to 8, wherein the davit arm comprises: a first beam and a second beam, a first end of the first beam being disposed on a first end of the second beam; and a cross beam disposed between the first beam and the second beam.

10. The fall arrest system of paragraph 9, wherein the first beam of the davit arm is disposed substantially perpendicular to the second beam and the post.

11. The fall arrest system of paragraph 9 or 10, wherein a cable support is disposed proximate a second end of the first beam and configured to support a cable therefrom.

12. A fall arrest system, comprising: a post disposed on a clamp, wherein the clamp is configured to secure the post to a base structure; a davit arm disposed on the post via one or more hinges, wherein the one or more hinges are disposed on a first end of the davit arm; and a winch disposed on the post having a cable extending therefrom toward a second end of the davit arm.

13. The fall arrest system of paragraph 12, wherein the davit arm comprises: a first beam secured at a first end to an upper end of a second beam, the second beam having a first hinge pin disposed proximate the upper end and a second hinge pin disposed proximate a lower end thereof; and a cross beam secured to the first and second beam.

14. The fall arrest system of paragraph 13, wherein the davit arm further comprises a cable support disposed proximate a second end of the first beam and configured to support the cable therefrom.

15. The fall arrest system of paragraph 14, further comprising a pulley block connected to the cable support, the pulley block having the cable disposed therethrough.

16. A method for installing a fall arrest system, comprising: disposing a first side plate of a clamp adjacent a first side of a base structure; disposing a second side plate of the clamp proximate a second side of the base structure, such that the base structure is at least partially interposed between the first side plate and the second side plate; securing the clamp to the base structure; connecting a post to a top plate of the clamp, the top plate being secured to the first and second side plates; and disposing a davit arm on the post via one or more hinges.

17. The method of paragraph 16, wherein securing the clamp to the base structure comprises actuating a biasing device disposed through the second side plate of the clamp to compress the base structure between an end of the biasing device and the first side plate of the clamp.

18. The method of paragraph 16 or 17, further comprising: disposing a winch onto a winch support of the post, the winch comprising a cable fed through a pulley block; and securing the pulley block to a cable support plate disposed on an end of the davit arm distal the one or more hinges.

19. The method according to any one of paragraphs 16 to 18, wherein disposing the davit arm on the post comprises inserting a hinge pin of the davit arm through an opening defined in a hinge plate of the post.

20. The fall arrest system according to any one of paragraphs 16 to 19, wherein the base structure is an excavation support structure.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A fall arrest system, comprising:

a base structure;

a clamp having a generally horizontal top plate and at least two side plates extending generally perpendicular to the top plate, wherein the side plates are arranged to straddle the base structure;

a post extending generally perpendicular from the top plate, above the base structure;

a davit arm extending from the post;

one or more hinges for connecting the davit arm to the post, allowing the davit arm to swivel *with respect to the post in a generally horizontal plane*, wherein the davit arm does not include a lockable structure that allows the davit arm to lock in a fixed position relative to a direction of the swivel, and wherein the davit arm is configured to support a cable therefrom; and a winch disposed along a length of the post for use with the cable supported by the davit arm, wherein the winch is connected to the post beneath the hinges and above the top plate of the clamp, and wherein the davit arm is configured to swivel with respect to the winch.

2. The fall arrest system of claim 1, wherein the base structure is interposed between the side plates.

3. The fall arrest system of claim 2, wherein the side plates comprise a first side plate and a second side plate, wherein the second side plate comprises a biasing device configured to place the first side plate in biasing engagement with a first side of the base structure, thereby securing the clamp thereto.

4. The fall arrest system of claim 3, wherein the biasing device comprises a screw-like device threadably engaged with a perforation defined in the second side plate, wherein an end of the screw-like device is configured to provide biasing engagement with a second side of the base structure.

5. The fall arrest system of claim 2, further comprising a connector at least partially disposed on the top plate, wherein the connector comprises a pipe, and the post is at least partially disposed through an open end of the pipe.

6. The fall arrest system of claim 1, wherein the winch is not configured to pivot about the post.

7. The fall arrest system of claim 1, wherein the one or more hinges each comprise:

a hinge plate disposed on the post and having a hole defined therethrough; and a hinge pin disposed on the davit arm and inserted into the hole in the hinge plate.

8. The fall arrest system of claim 1, wherein the one or more hinges each comprise:

a hinge plate disposed on the davit arm and having a hole defined therethrough;

a pin support disposed on the post; and a hinge pin disposed on the pin support and inserted into the hole in the hinge plate.

9. The fall arrest system of claim 1, wherein the davit arm comprises:

a first beam and a second beam, a first end of the first beam being disposed on a first end of the second beam; and a cross beam disposed between the first beam and the second beam.

10. The fall arrest system of claim 9, wherein the first beam of the davit arm is disposed substantially perpendicular to the second beam and the post.

11. The fall arrest system of claim 9, further comprising a cable support disposed proximate a second end of the first beam, the cable being disposed on or within the cable support.

12. A fall arrest system, comprising:

a generally horizontal base structure;

a clamp having a generally horizontal top plate and at least two side plates extending generally perpendicular to the top plate, wherein the side plates are arranged to straddle the base structure;

a pipe at least partially disposed on the top plate;

a post extending generally perpendicular from the top plate, above the base structure, wherein the post is at least partially disposed through an open end of the pipe;

a davit arm extending from the post;

one or more hinges for connecting the davit arm to the post, allowing the davit arm to swivel *with respect to the post in a generally horizontal plane*, wherein the davit arm does not include a lockable structure that allows the davit arm to lock in a fixed position relative to a direction of the swivel, and wherein the davit arm is configured to support a cable therefrom; and a winch disposed along a length of the post for use with the cable supported by the davit arm, wherein the winch is connected to the post beneath the hinges and above the top plate of the clamp, and wherein the davit arm is configured to swivel with respect to the winch.

13. The fall arrest system of claim 12, wherein the davit arm comprises:

a first beam secured at a first end to an upper end of a second beam, the second beam having a first hinge pin disposed proximate the upper end and a second hinge pin disposed proximate a lower end thereof; and a cross beam secured to the first and second beam.

14. The fall arrest system of claim 13, wherein the davit arm further comprises a cable support disposed proximate a second end of the first beam, the cable being disposed on or within the cable support.

15. The fall arrest system of claim 14, further comprising a pulley block connected to the cable support, the pulley block having the cable disposed therethrough.

16. A method for installing a fall arrest system, comprising:

disposing a clamp having a generally horizontal top plate and at least two side plates over a base structure;

disposing a first side plate of the clamp adjacent a first side of the base structure;

disposing a second side plate of the clamp proximate a second side of the base structure, such that the first side plate and the second side plate saddle the base structure;

securing the clamp to the base structure;

connecting a post to the clamp, such that the post extends generally perpendicular from the top plate, above the base structure;

connecting a davit arm to the post with one or more hinges that allow the davit arm to swivel *with respect to the post in a generally horizontal plane*, wherein the davit arm does not include a lockable structure that allows the davit arm to lock in a fixed position relative to a direction of the swivel, and wherein the davit arm is configured to support a cable therefrom; and disposing a winch along a length of the post for use with the cable supported by the davit arm, wherein the winch is connected to the post beneath the hinges and above the top plate of the clamp, and wherein the davit arm is configured to swivel with respect to the winch.

17. The method of claim 16, wherein securing the clamp to the base structure comprises actuating a biasing device disposed through the second side plate of the clamp to compress the base structure between an end of the biasing device and the first side plate of the clamp.

18. The method of claim 16, further comprising:

disposing the winch onto a winch support of the post, the winch comprising the cable, wherein the cable is fed through a pulley block; and securing the pulley block to a cable support plate disposed on an end of the davit arm distal the one or more hinges.

19. The method of claim 16, wherein connecting the davit arm to the post comprises inserting a hinge pin of the davit arm through an opening defined in a hinge plate of the post.

20. The fall arrest system of claim 16, wherein the base structure is an excavation support structure.

* * * * *